United States Patent
Kirihara et al.

(10) Patent No.: US 6,765,786 B2
(45) Date of Patent: Jul. 20, 2004

(54) NIOBIUM POWDER AND SOLID ELECTROLYTIC CAPACITOR USING THE SAME

(75) Inventors: Tadasu Kirihara, Chiba (JP); Nobuyuki Sato, Chiba (JP); Osamu Ebato, Chiba (JP); Kan Saito, Chiba (JP)

(73) Assignee: Kawatetsu Mining Co., Ltd. (JP)

( * ) Notice: Subject to any disclaimer, the term of this patent is extended or adjusted under 35 U.S.C. 154(b) by 0 days.

(21) Appl. No.: 10/391,254

(22) Filed: Mar. 18, 2003

(65) Prior Publication Data

US 2003/0179522 A1 Sep. 25, 2003

(30) Foreign Application Priority Data

Mar. 20, 2002 (JP) ......................................... 2002-079196
Dec. 24, 2002 (JP) ......................................... 2002-372394

(51) Int. Cl.[7] .......................... H01G 9/04; H01G 9/145; B22F 1/00; C22C 27/02
(52) U.S. Cl. .......................... 361/528; 361/524; 75/252; 420/425
(58) Field of Search ................................. 361/523–524, 361/528, 532–533; 75/252; 420/425

(56) References Cited

U.S. PATENT DOCUMENTS 6,652,619 B2 * 11/2003 Omori et al. .................. 75/255
2002/0134196 A1 * 9/2002 Naito ........................... 75/245
2003/0218857 A1 * 11/2003 Omori et al. ................ 361/501

* cited by examiner

*Primary Examiner*—Dean A. Reichard
*Assistant Examiner*—Eric Thomas
(74) *Attorney, Agent, or Firm*—Piper Rudnick LLP

(57) ABSTRACT

A niobium powder is provided for producing a niobium capacitor enhanced in the thermal stability of oxide films on niobium, with less leak current and less deterioration of leak current after application of thermal loads. The niobium powder contains form 0.005 to 0.10 mass % of hydrogen and from 0.002 to 5 mass % of sulfur and, further preferably, one or both of magnesium and aluminum in an amount from 0.002 to 1 mass % in total. The specific surface area of the powder is 1 to 10 $m^2/g$ and the average particle diameter of the secondary particles is 10 to 200 $\mu m$.

6 Claims, No Drawings

NIOBIUM POWDER AND SOLID ELECTROLYTIC CAPACITOR USING THE SAME

BACKGROUND OF THE INVENTION

1. Field of the Invention

The present invention concerns a niobium powder and an electrolytic capacitor formed by using the powder.

2. Description of the Related Art

While tantalum powder has been used so far for electrolytic capacitors, it involves a problem that the deposit is limited and its supply cost is not stable. In recent years, a trend of using niobium of rich deposit and available at reduced cost for the anode of electrolytic capacitors has been promoted. However, electrolytic capacitors using niobium have several drawbacks compared with those using tantalum. A primary problem is that oxide films of niobium have poor thermal stability. This results in leak current due to thermal loads upon mounting of parts to bring about deterioration of capacitors.

As a countermeasure, nitrogen addition has been known in order to decrease the leak current (for example, refer to Metal, vol. 72 (2002), No. 3, p 221). However, such a countermeasure can not be effective for improving the thermal stability.

A technique of reducing niobium pentachloride with hydrogen into a niobium powder has been present. However, since hydrogen remaining in the niobium powder after reduction reaches as much as 0.7 to 0.8 mass %, an electrolytic capacitor using the powder shows large leak current and large leak current after application of thermal loads, and is somewhat poor in static capacitance.

On the contrary, the present inventors have previously proposed a niobium powder containing small amount of hydrogen 1 to 600 ppm and a substantial balance of niobium (for example, in Japanese Patent Application No. 2002-22824 (pages 2–6)). The niobium powder described above is produced by applying a heat treatment, for example, at a temperature of about 1000° C. or higher in an Ar atmosphere, to a niobium powder obtained by reducing niobium pentachloride with hydrogen described above. When this is used for an anode of a solid electrolytic capacitor, it provides excellent performance having large static capacitance of the capacitor and showing less leak current.

A solid electrolytic capacitor has a structure in which niobium, niobium oxide, solid electrolyte, graphite, silver, etc. are laminated and it is manufactured by sintering a niobium powder at 1000 to 1400° C. to prepare a porous sintered product, applying a formation treatment to form a niobium oxide film on niobium, then forming solid electrolyte, graphite and silver successively into a layerous form and, finally, connecting an anode as an external terminal to niobium.

The present invention has been accomplished by further improving the invention in Japanese Patent Application No. 2002-11824 described above and the invention intends to provide a niobium powder for preparing a solid electrolytic capacitor with less leak current, less degradation of leak current after application of thermal loads and having high capacitance by enhancing stability of niobium oxide films in the capacitor, as well as a solid electrolytic capacitor using the powder described above.

SUMMARY OF THE INVENTION

The present invention provides a niobium powder comprising 0.005 to 0.10 mass % of hydrogen, 0.002 to 5 mass % of sulfur, in which a specific surface area of the powder is from 1 to 10 m$^2$/g.

Further, the powder preferably comprises one or both of magnesium and aluminum by 0.002 to 1 mass % for further improvement of characteristics.

Further, an average particle diameter of secondary particles of the powder is preferably from 10 to 200 µm.

A solid electrolytic capacitor having a sintered product from one of the niobium powders described above as an anode of it has excellent performance in view of static capacitance and leak current characteristics.

DESCRIPTION OF THE PREFERRED EMBODIMENT

It has been found by the present inventors that leak current is decreased in a capacitor and has also been found that thermal stability of oxide films of niobium is improved by restricting the amount of hydrogen in the niobium powder to a predetermined amount, adding sulfur and, further, adding magnesium and aluminum. The invention has been accomplished based on such findings.

The effect is remarkable in a powder with a small primary particle diameter to provide a niobium powder for use in an electrolytic capacitor having both high capacitance and low leak current. Further, when the average secondary particle diameter is controlled to 10 to 200 µm, moldability can be kept even when primary particles are fine particles. Further, a niobium powder with addition of an appropriate amount of sulfur can unexpectedly reduce pressure during molding. In a niobium powder comprising an appropriate amount of hydrogen, the boundaries of the secondary particles are invisible after pressing, and chipping of edges of molded products is suppressed. Therefore, the moldability can be improved remarkably compared with niobium powders not added sulfur or hydrogen.

The niobium powder can be produced by using, for example, a CVD apparatus. The niobium powder is produced by using a mixture of niobium pentachloride and a sulfur compound as a starting material and reducing the mixture by using hydrogen gas. The primary particle diameter can be controlled to an appropriate diameter by controlling reaction conditions for the starting material, mainly, the staying time and the temperature. Further, the secondary particle diameter and the hydrogen content can be controlled by applying a heat treatment at about 1000° C. in an atmosphere of a non-hydrogen gas such as argon, as the secondary particles are formed by agglomeration of the primary particles. An electrolytic capacitor using the above described niobium powder is excellent in the static capacitance characteristic and shows less leak current and less leak current after application of thermal loads.

Further, the leak current and the leak current after application of thermal loads of an electrolytic capacitor are further decreased by using a mixture of niobium pentachloride, magnesium chloride, aluminum chloride and a sulfur compound in the production process for the niobium powder described above.

A solid electrolytic capacitor was manufactured by using a niobium powder prepared as described above and by way of the following method, and static capacitance and leak current of the capacitor were measured. A niobium wire of 0.3 µm diameter used for an anode was buried in 0.1 g of niobium powder, which was press molded to a green pellet of a bulk density of 3000 kg/m$^3$. The prepared pellet was sintered in an atmosphere at an internal furnace pressure of 1×10$^{-3}$ Pa (Pascal) at a temperature between 1100 and 1400°

C. The thus sintered pellet was immersed in an aqueous solution of 0.5 mass % phosphoric acid, and a voltage at 20 V was applied for four hours to form chemically formed films on the surface of porous niobium to manufacture a niobium capacitor as a sample. Then, capacitance and leak current of the niobium capacitor were measured in a 40 mass % sulfuric acid aqueous solution. For the leak current, a value five minutes after application of 14 V was measured and, for the capacitance, a value at 120 Hz in a state of applying a bias of 1.5 V was measured.

EXAMPLE

Embodiments of the present invention are described with reference to the following examples.

Examples 1 to 5, Comparative Examples 1 to 6

When a niobium powder was prepared by hydrogen reduction of niobium pentachloride, ingredients in the niobium powder were varied by changing the addition amounts of sulfur, aluminum chloride and magnesium chloride. Further, for Examples 1 to 5 and Comparative Examples 1 to 4 and 6, a heat treatment was applied in an argon atmosphere in which the temperature for the heat treatment was changed to vary the secondary particle diameter. Pellets were prepared by using the niobium powder thus obtained, and the treatment described above was applied to the pellets and various characteristics were measured. The results are shown in Table 1.

TABLE 1

| No. | Presence of various additive ingredients in niobium starting material | | | Heat treatment temperature (° C.) | Niobium powder Ingredient (mass %) | | | |
|---|---|---|---|---|---|---|---|---|
| | Sulfur | Aluminum chloride | Magnesium chloride | | Hydrogen | Sulfur | Aluminum | Magnesium |
| Example 1 | present | none | none | 1000 | 0.020 | 0.020 | 0.001 | 0.001 |
| Example 2 | present | present | none | 1000 | 0.006 | 0.050 | 0.005 | 0.001 |
| Example 3 | present | none | present | 950 | 0.029 | 4.5 | 0.001 | 0.80 |
| Example 4 | present | present | present | 1000 | 0.075 | 0.32 | 0.015 | 0.01 |
| Example 5 | present | present | present | 1000 | 0.032 | 0.25 | 0.080 | 0.16 |
| Comp. Example 1 | none | none | none | 950 | 0.015 | 0.001 | 0.001 | 0.001 |
| Comp. Example 2 | present | none | none | 950 | 0.008 | 6.5 | 0.001 | 0.001 |
| Comp. Example 3 | none | present | none | 1050 | 0.095 | 0.001 | 0.025 | 0.001 |
| Comp. Example 4 | none | none | present | 1050 | 0.020 | 0.001 | 0.001 | 0.020 |
| Comp. Example 5 | none | none | none | — | 0.75 | 0.001 | 0.001 | 0.001 |
| Comp. Example 6 | present | none | none | 1150 | 0.031 | 0.072 | 0.001 | 0.001 |

| No. | Niobium powder | | Niobium capacitor | | | Remarks |
|---|---|---|---|---|---|---|
| | Specific surface area ($m^2/g$) | Average secondary particle diameter ($\mu m$) | Capacitance ($\mu FV/g$) | Leak current ($\mu A/\mu F$) no thermal load | Leak current ($\mu A/\mu F$) After thermal load | |
| Example 1 | 3.7 | 53 | 153000 | 0.0052 | 0.0055 | |
| Example 2 | 7.5 | 121 | 184000 | 0.0043 | 0.0044 | |
| Example 3 | 5.2 | 184 | 162000 | 0.0032 | 0.0033 | |
| Example 4 | 4.8 | 22 | 157000 | 0.0029 | 0.0032 | |
| Example 5 | 2.8 | 96 | 156000 | 0.0010 | 0.0015 | |
| Comp. Example 1 | 3.4 | 120 | 164000 | 0.0085 | 0.0794 | |
| Comp. Example 2 | 5.8 | 150 | 12500 | 0.0353 | 0.0422 | |
| Comp. Example 3 | 2.1 | 220 | 95000 | 0.0184 | 0.0584 | |
| Comp. Example 4 | 1.8 | 87 | 43000 | 0.0052 | 0.0840 | |
| Comp. Example 5 | 5.4 | 120 | 28000 | 0.0550 | 0.0910 | with no heat treatment for Nb powder |
| Comp. Example 6 | 0.9 | 125 | 4600 | 0.0025 | 0.0031 | small specific surface area |

The hydrogen content in the niobium powder was measured by a thermoelectric conduction method, while the sulfur content in the niobium powder was measured by an infrared light absorption during combustion. The aluminum content and the magnesium content in the niobium powder were measured by inductively coupled plasma spectrometry (ICP) after pretreatment of adding hydrofluoric acid and nitric acid to the niobium powder and decomposing them under heating in a water bath.

The specific surface area of the niobium powder was measured by a BET method. Further, $D_{50}$ of the niobium powder was determined by using a laser diffraction particle size analyzer and the value was defined as an average secondary particle diameter.

As shown in Table 1, in a case of using an niobium powder containing sulfur within a range from 0.002 to 5 mass % and hydrogen within a range from 0.005 to 0.1 mass %, capacitors having large static capacitance, with less leak current and showing excellent results were manufactured.

In a case of using sulfur within a range from 0.002 to 5 mass % and containing appropriate amount of aluminum and/or magnesium, capacitors having high electrostatic capacitance and with lesser leak current were manufactured.

Further, after leaving the sample after a formation treatment prepared as described above in a drying furnace heated at 250° C. for 1 hour (after application of thermal loads), a leak current was measured. In a sample not containing sulfur or the like, the average leak current after heating was increased by about 15 times, whereas there is no large difference before and after the heating in a sample using the niobium powder according to the invention.

While the invention has been described with reference to several preferred embodiments, it should be understood that such embodiments are shown only as illustrating examples of the invention, and should not be construed in a sense of limiting the invention. After examining the present specification, those skilled in the art will recognize various modifications and substitutions with equivalent materials or techniques, and it is considered that all of such modifications and substitutions are within the scope of the claims of the present application.

According to the invention, important oxide films can be stabilized when a capacitor is manufactured by adding specific ingredients to the niobium powder. As a result, not only degradation of characteristics due to high temperature during mounting of parts (reflow) can be prevented generally but also it can sufficiently endure for use of lead-free solder considering environmental problems. Further, stabilization of the oxide films enables to manufacture a niobium capacitor of excellent characteristics reduced in the leak current and having large capacitance.

What is claimed is:

1. A niobium powder comprising 0.005 to 0.10 mass % of hydrogen and from 0.002 to 5 mass % of sulfur, in which the specific surface area of the powder is from 1 to 10 $m^2/g$.

2. A niobium powder as defined in claim 1, which further comprises one or both of magnesium and aluminum by 0.002 to 1 mass %.

3. A niobium powder as defined in claims 1 or 2 and consisting essentially of secondary particles, wherein the average particle diameter of secondary particles is from 10 to 200 $\mu$m.

4. A solid electrolytic capacitor having a sintered product from a niobium powder as defined in claim 3, as an anode thereof.

5. A solid electrolytic capacitor having a sintered product from a niobium powder as defined in claim 2, as an anode thereof.

6. A solid electrolytic capacitor having a sintered product from a niobium powder as defined in claim 1, as an anode thereof.

* * * * *